2,928,715

PREPARATION OF SHAPED POLYACRYLONI-TRILE STRUCTURES

Paul Halbig, Fribourg, Switzerland

No Drawing. Application September 25, 1952
Serial No. 311,530

Claims priority, application Switzerland
September 29, 1951

8 Claims. (Cl. 18—54)

The invention relates to a method of preparing shaped structures, such as filaments, films and the like from polyacrylonitrile compositions containing at least about 80 percent by weight of polyacrylonitrile.

Polymers of acrylonitrile, which are built up completely or for a greater part from acrylonitrile, can be dissolved in nitric acid and can be formed into articles, particularly filaments, as described in my copending patent application, Serial No. 236,081, filed July 10, 1951, now abandoned, of which this application is a continuation-in-part. Thereby chemical modifications of the dissolved polymer may however easily occur, so that the shaped materials do not correspond any more to the original composition and depending on the age of the processed solution show divergent properties, which is as a rule of disadvantage for industrial purposes.

The object of this invention is a process for the dissolving of polymers of acrylonitrile in nitric acid and for the shaping of this solution into patterns with the chemical composition of the initial material. This object is arrived at with the aid of definite measures which are given in the following description.

The needed measures can be summed up in three groups:

(1) The concentration of the acid, the way of preparing the solution and the temperatures during the operations are chosen in such a way that a chemical change of the dissolved substance is prevented.

(2) The acid and the solution is freed of nitric oxides and stabilised with urea.

(3) The polymers are produced with definite catalysts.

The stability of the polyacrylonitrile in nitric acid is dependent to an extraordinarily great extent from the temperature. That was to be expected, but it is surprising that it is possible to dissolve this nitrile in nitric acid and to bring it again to separation in an unchanged state. Definite polymers can be stored for several days in nitric acid solutions at 10–20° C. and then can be regenerated on precipitation substantially unaltered. At elevated temperature, especially over 80° C., rapid changes take place and at temperatures of between 100° and 180° C., these solutions remain stable hardly a few minutes. The nitric acid containing solutions are therefore produced at temperatures under 80° C., preferably at 0–50° C., and stored, if that is necessary, at 0–20° C. for the subsequent processing of the solutions, higher temperatures may be used only for short periods of time. At 80–90° C., 5–10 minutes are admissible; at 100–180° C., periods should not exceed two minutes, as long as the nitric acid is not completely removed.

As stated in the above mentioned patent application, nitric acid in the concentration range from 46–68% can be used. The dependence of the solution from the concentration and the temperature is illustrated in the following table:

| | °C. |
|---|---|
| 46% | 98 |
| 48% | 85 |
| 50% | 70 |
| 52% | 55 |
| 54% | 25 |
| 56% | Under 15 |

Particularly suitable are acids with a content of 52–65% so that temperatures above 55° C. are not necessary in the preparation of the solution. Acids having a higher concentration than 65% may already have a nitrating effect on the polymer. For the stability of the solution the absence of nitric oxides is of further importance. For this purpose, the solutions are prepared in vacuo, whereby nitric oxides are sucked off as soon as they are formed. In the final solutions the formation of nitric oxides may be retarded by small quantities of urea.

As stated in the patent application Serial No. 294,482, filed June 19, 1952, now Patent No. 2,671,768, part of the nitric acid can be replaced by nitromethane, which of itself is not a solvent for polyacrylonitrile. The invention includes also the use of such nitric acid-nitromethane mixtures as a solvent.

The nitric acid solutions of the polyacrylonitrile may be prepared in various ways. The polymer may be agitated with an acid of suitable concentration, for instance with 60% nitric acid at 20° C. until it is dissolved, which requires several hours. A quicker procedure consists in mixing polymer powder at 0–20° C. first with an amount of 52 to 54% nitric acid sufficient to obtain a liquid suspension, which is then degassed in vacuo and converted into a solution by heating. A still better method, which avoids heating, is as follows: A suspension with 52 to 54% nitric acid is prepared at 0–20° C. and degassed in vacuo. Subsequently, 65% nitric acid is added in such an amount as to produce with the starter nitric acid of 52 to 54% an acid having a concentration of 59%, whereby the suspension is converted to a solution. Instead of preparing the suspensions with dilute nitric acid as described hereinabove, nitromethane may be used for this purpose, whereupon the suspension is converted into a solution by the addition of higher concentrated acid.

The solutions can also be prepared in continuous processes by conducting polymer and solvent currently in the calculated proportion to a mixing device, as for instance a mixing worm. Thereby the production time can be shortened. A suspension may first be produced from a 49–50% acid, degassed, and this suspension then be converted in the screw-mixer by short heating at 48–80° C. to a solution which is afterwards immediately spun. The same solution may also be mixed in the screw-mixer with a stronger nitric acid in such concentration and amount as to already produce a solution at 10–20° C. and to then shape this solution.

I have also found that the stability of the polymer in nitric acid solutions depends on the nature of the catalyst used for the polymerisation. The products prepared with persulfates and sulfur-containing activators are the most sensitive polymers in solution. Best suitable are the polymers prepared with organic catalysts, of which I prefer the peroxides of aliphatic carboxylic acids. This was determined as follows:

A polyacrylonitrile having a molecular weight of 85,000 was prepared with ammonium persulfate according to the method described in the copending application Serial No. 269,606, filed February 1, 1952, now abandoned. This polyacrylonitrile will be designated by the letter A. A polyacrylonitrile of the same molecular weight was prepared with acetyl peroxide, designated in the following by the letter B. From A and B, 8% solutions in 58% nitric acid were prepared and stored at 20° C. In certain intervals, the viscosity of the two solutions was determined by the ball-drop method (see Analytical Chemistry, vol. 22 (1950), page 656). I obtained the following ball-drop times:

| Storage time, hours | Ball-Drop, seconds | |
|---|---|---|
| | Solution A | Solution B |
| 10 | 45 | 46 |
| 30 | 39 | 53 |
| 60 | 36 | 54 |
| 90 | 33 | 54 |
| 120 | 28 | 54 |
| 150 | 23 | 53 |
| 180 | 20 | 51 |

It will be noted that the viscosity of the solution A (persulfate) decreases quickly and continuously, whereas the viscosity of the solution B (peroxide) remains, after an initial increase, substantially constant.

Similarly, the superiority of the solution B is also shown by the determination of the weight increase of the dissolved polymer, which increase is due to a partial saponification of the nitrile group. I found the following increase for the same polymers and the same solutions prepared under the same conditions as above.

| Storage time, hours | Weight increase in percent | |
|---|---|---|
| | Solution A | Solution B |
| 24 | 0 | 0 |
| 48 | 0.3 | 0 |
| 72 | 2.7 | 0 |
| 120 | 3.9 | 1.1 |

From this table follows that B is unchanged even after more than 100 hours.

The processing and particularly the spinning of such solutions to filaments is the easier and the more economic the higher the polymer content of the solution is. The viscosity of the solution depends on the concentration and on the molecular weight of the polymer. Products with an average molecular weight exceeding 90,000 have in 20% solution at 20° C. such a high viscosity that they can be moved at a useful speed only by the use of considerable pressure.

Products having an average molecular weight in the range of 10,000 to 90,000 are particularly suitable for the invention. Such products are readily worked up with an about 60% nitric acid already at 0–50° C. to 10 to 20% solutions, which have a viscosity of 20 to 500 poises and are easy to handle. By means of continuous mixing devices, for instance screw-mixers, which simultaneously carry out the dissolving and the pumping of the solutions, solutions of much higher concentration can be prepared and processed.

Such solutions are suitable for the manufacture of films and particularly of filaments, which may be produced by the known dry and wet spinning processes. In order to improve the mechanical properties of the filament, it can be cold or warm stretched in the dry or wet state, released and crimped. These operations are not an object of the invention. In spinning, the solvent may be washed out or removed by means of hot gases.

The following examples will illustrate the idea of the invention, parts are given by weight.

*Example 1*

In a stainless steel stirring vessel resistant to pressure 4000 g. of water, 10 g. of a copolymer from 60 parts of vinylacetate and 40 parts of maleic acid anhydride, 10 g. of calciumnitrate, 2 g. of 60% nitric acid, 120 g. of acetaldehyde and 500 g. of benzene are mixed at a temperature of 70° C. Thereto 1000 g. of acrylonitrile and 1.2 g. of acetylperoxide are added. After 2.4 and 6 hours 500 g. of acrylonitrile and 0.6 g. of acetylperoxide are admixed, so that a totality of 2500 g. of acrylonitrile get into the polymerisation vessel. After 9 hours in all the benzene and the unchanged acrylonitrile are distilled off. The content of the autoclave now consists of a suspension of the obtained acrylonitrile copolymer in water. The polymer is sucked off, washed and dried. 2000 to 2100 g. of a finely powdered polymer are obtained, its apparent density is 0.40–.50, its molecular weight 57,000 to 59,000.

100 g. of a polymer produced in the above-mentioned way having a molecular weight of 57,300 are stirred at 10–15° C. in 400 g. of nitric acid of 53% by weight to a suspension and degassed in vacuo. Then 450 g. of $HNO_3$ of 65% by weight and 1 g. of urea are added and stirring is continued at 15° C. under an absolute pressure of a mercury stem of 20–30 mm. Then the vacuum is released. An approximately water-clear solution of polyacrylonitrile in 59% nitric acid is obtained. The solution is stored at 15° C.

The appearance of the solution remains unchanged for more than 100 hours. Only after 160 hours the formation of small gas bubbles is noticeable. After 100 hours the polymer is precipitated from a sample of the solution with water, washed until it is acid-free, and dried at 50° C. to the weight constancy. The precipitated product is soluble in dimethylformamide. The determination of the molecular weight and of the nitrogen content gives 57,000 respectively 25.68%. Compare Kern and Fernow, Journal für praktische Chemie p. 287 (1942), and Ch. D. Coxe in German patent application No. 31,878 of Du Pont de Nemours & Co., page 5, wherein a nitrogen content of 25.66% resp. 25.6% is indicated as characteristic for polyacrylonitrile.

A further examination of the constancy of the polymer in nitric acid solution was carried out in the following manner: A definite polymer quantity is weighted with analytical exactness, dissolved in 58% nitric acid at 20° resp. 30° C. and aged in the thermoregulator at 20° resp. 30° C. At definite intervals, the sample was precipitated with water, washed and dried till the weight was constant.

The following weight increases are noted:

| Storage time | Weight increase | |
|---|---|---|
| | at 20° | at 30° |
| 8 hours | no | no |
| 16 hours | no | 5.7% |
| 48 hours | no | Decomposition. |
| 96 hours | no | Do. |
| 120 hours | 1.1+ | Do. |

A further examination on the durability of the polymer in nitric acid solution is carried out by the determination of the water-absorption of a film produced from the solution. For this purpose a specimen of the above described solution is smeared on a glass slide and dried under air suction in a drying oven preheated to 120° C. leaving the door ajar. The dry film is stripped off from the glass slide in the waterbath and dried for 12 hours at 100° C. Afterwards the film is weighted accurately, then placed in water for 24 hours, superficially dried with filter paper and finally stored in a desiccator over water for 24 hours. The water-absorption is 2.1%. The water-absorption of acrylonitrile is approximately 2.5% according to J. B. Quig, "Papers of the American Association of Textile Technologists," March 1949, page 63.

These experiments show that polyacrylonitrile can be dissolved in nitric acid and that after aging for some days can be isolated practically unaltered from this solution.

Example 2

100 g. of polyacrylonitrile having an average molecular weight of 39,000, produced according to the above-mentioned patent application Serial No. 236,081, now abandoned, are mixed with 350 g. of 53% nitric acid at 20° C. An easily flowing suspension is obtained. This suspension is placed under a reduced pressure of about 20 mm. Hg and degassed, which requires about 10 min. Hereby, the polymer is not, or is only to a small degree, dissolved. Then, 350 g. of 65% nitric acid and 1 g. of urea are admixed to the suspension. Within a few minutes, a clear, limpid solution is obtained, which has at 20° C. a viscosity of 34 poises. This solution is spun through a spinneret having holes of 0.1 mm. at a rate of 9 m./min. into a water bath. The filament travels through the water bath for a length of 8 cm., whereby only part of the nitric acid is removed; the filament is then passed through a chamber of 3 m. length, where it is dried by hot air of 150° C. in order to drive off the rest of the nitric acid. After leaving the drying chamber, the filament is wound up at a speed of 15 m./min. and subsequently stretched at 170° C. to six times its length. Finally, the filament is again rinsed with water containing some ammonia to remove residual traces of acid. The filament shows the following properties: Dry tenacity 3.2 g./den., wet tenacity 3.3 g./den., loop tenacity 2.4 g./den., dry elongation 15%, wet elongation 17%.

Substances which prevent the sticking together of the filaments, for instance inorganic salts, may be added to the coagulating bath.

Example 3

100 g. of a conjoint polymer consisting of 90 parts of acrylonitrile and 10 parts of vinylacetate, having a molecular weight of 30,000 and produced according to the above-mentioned patent application Serial No. 294,482, now Patent No. 2,671,768, are suspended in 250 parts of nitromethane, degassed at reduced pressure and then dissolved by adding 150 parts of nitric acid of 58% concentration. All these manipulations are carried out at room temperature. Within a few minutes a water-clear solution is obtained, which can be readily spun to filaments by a conventional dry spinning process. By pouring out the solution on a glass slide and evaporation of the solvent in an air current of 80–110° C., a crystal-clear film will be obtained which consists of acrylonitrile-vinyl acetate copolymer. The water absorption of the film in water of 20° C. in 24 hours is 2.1%, it is soluble in dimethylformamide.

Example 4

1000 g. of an acrylonitrile copolymer of the molecular weight of 60,000, produced in the manner as indicated in Example 1, are processed, with 10 g. of urea and 9000 g. of nitric acid of 59% by weight, to a solution as described in Example 1. The solution is filtered through an acidproof steel wire gauze and in a manner known spun by means of a spinning pump and a spinneret having 10 holes of 0.2 mm diameter into a waterbath. Solution and coagulating bath are kept at 10–20° C. After leaving the bath, the filaments are washed with water until they are free from acids, then travel through a waterbath of 90° C. The bath contains 0.2% polyvinylalcohol, 2% glycerine and 0.1% phosphoric acid. The filaments are then dried at 100–120° C., stretched at 140–150° C., and again shrunk at the same temperature by 15–20%. The spinning pump and spinning speed is so regulated, that a filament form of 30 den. results. The spinning experiment is kept going with the same solution for 96 hours. The nitrogen content of the filament is during the whole experimental time about 25.6%.

The tensile strength of the filament is 4 g., the loop tenacity 2.3 g./den. and the elongation 18–22%. The filament supplies substantially the same values in the wet state.

What I claim is:

1. The process of preparing shaped polyacrylonitrile containing structures which comprises dissolving an acrylonitrile polymer containing at least 80 percent of acrylonitrile in the polymer molecule, the balance being copolymerizable unsaturated compounds other than acrylonitrile, at temperatures between 0 and 80° C. in nitric acid having a concentration of 49 to 68 percent by weight to a stable solution suitable for extrusion, eliminating the nitric oxides during the dissolving process, and extruding said solution into a coagulating medium, before a chemical modification of the dissolved acrylonitrile polymer occurs.

2. The process of preparing shaped polyacrylonitrile containing structures which comprises dissolving an acrylonitrile polymer containing at least 80 percent of acrylonitrile in the polymer molecule, the balance being copolymerizable unsaturated compounds other than acrylonitrile, at temperatures between 0 and 80° C. in nitric acid having a concentration of 49 to 68 percent by weight to a stable solution suitable for extrusion, eliminating the nitric oxides by sucking them off in vacuo during the dissolving process, and extruding said solution into a coagulating medium, before a chemical modification of the dissolved acrylonitrile polymer occurs.

3. The process of preparing shaped polyacrylonitrile containing structures which comprises dissolving an acrylonitrile polymer at temperatures between 0 and 80° C. in nitric acid having a concentration of 49 to 68 percent by weight to a stable solution suitable for extrusion, removing nitric oxides, and forming said solution into a predetermined shape, before a chemical modification of the dissolved acrylonitrile polymer occurs, said acrylonitrile polymer containing at least 80 percent by weight of polyacrylonitrile obtained by the catalytic polymerization of acrylonitrile in the presence of a peroxide of an aliphatic acid, the balance being copolymerizable unsaturated compounds other than acrylonitrile.

4. The process of preparing shaped polyacrylonitrile containing structures which comprises suspending an acrylonitrile polymer containing at least 80 percent by weight of acrylonitrile in the polymer molecule, the balance being copolymerizable unsaturated compounds other than acrylonitrile, in nitric acid having a concentration of 49 to 68 percent by weight at a temperature where no substantial solution of said polymer in the nitric acid takes place, heating said suspension to a temperature not exceeding 80° C. so as to dissolve said polymer in said nitric acid, removing nitric oxides, and forming said solution into a predetermined shape, before a chemical modification of the dissolved acrylonitrile polymer occurs.

5. The process as claimed in claim 4 including the step of degassing the suspension of the acrylonitrile containing polymer in nitric acid at reduced pressure prior to the heating step.

6. The process of preparing a solution of a polymer of acrylonitrile with nitric acid and water, comprising the steps of dispersing a polymer of acrylonitrile containing at least 80 percent of acrylonitrile, the balance being copolymerizable unsaturated compounds other than acrylonitrile, in a solution consisting of 46–54 percent nitric acid and 54–46 percent of water at a temperature of 0–20° C., degassing the dispersion in vacuo, adding to said dispersion without raising the temperature concentrated nitric acid until the $HNO_3$ concentration of the dilute nitric acid reaches about 59%, and dissolving said polymer in said solution.

7. The process of preparing shaped polyacrylonitrile-containing structures, comprising the steps of dispersing a polymer of acrylonitrile containing at least 80 percent of acrylonitrile, the balance being copolymerizable unsaturated compounds other than acrylonitrile, in a solution consisting of 46–54 percent of nitric acid and 54–46 percent of water at a temperature of 0–20° C., degassing the dispersion in vacuo, heating said dispersion to a temperature not exceeding 80° so as to dissolve rapidly the minute particles of the acrylonitrile polymer in said solution, and extruding said solution into a coagulating bath before a chemical modification of the dissolved acrylonitrile polymer occurs.

8. A process for obtaining shaped articles which comprises the steps of dispersing at a temperature of 0–20° C. a polymer of acrylonitrile containing at least 80 percent of acrylonitrile, the balance being copolymerizable unsaturated compounds other than acrylonitrile, in nitric acid of 46–54 percent $HNO_3$ content, degassing said dispersion in vacuo, adding to said dispersion without raising the temperature concentrated nitric acid until the nitric acid contains about 59 percent of $HNO_3$, dissolving the minute polymer particles in said nitric acid, and extruding the solution into a coagulating bath consisting of water and less than 30 percent of nitric acid, before a chemical modification of the dissolved acrylonitrile polymer occurs.

References Cited in the file of this patent

UNITED STATES PATENTS

| | | |
|---|---|---|
| 2,579,451 | Polson | Dec. 18, 1951 |
| 2,671,768 | Halbig | Mar. 9, 1954 |

FOREIGN PATENTS

| | | |
|---|---|---|
| 665,004 | Great Britain | Jan. 16, 1952 |